US008131265B2

(12) United States Patent
Cheng et al.

(10) Patent No.: US 8,131,265 B2
(45) Date of Patent: Mar. 6, 2012

(54) SYSTEM AND METHOD FOR IMPLEMENTING MULTIMEDIA RING BACK TONE SERVICE

(75) Inventors: Yihua Cheng, Guangdong (CN); Xiaoqing Hu, Guangdong (CN); Yichu Zheng, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 920 days.

(21) Appl. No.: 11/964,075

(22) Filed: Dec. 26, 2007

(65) Prior Publication Data
US 2008/0102800 A1 May 1, 2008

Related U.S. Application Data

(63) Continuation of application No. PCT/CN2007/000737, filed on Mar. 7, 2007.

(30) Foreign Application Priority Data

Mar. 10, 2006 (CN) .......................... 2006 1 0058515
Aug. 16, 2006 (CN) .......................... 2006 1 0111402

(51) Int. Cl.
*H04Q 7/22* (2006.01)
(52) U.S. Cl. ................... 455/412.2; 455/414.1
(58) Field of Classification Search ............... 455/412.2, 455/414, 401, 425, 433, 567, 419, 412.1, 455/414.1; 370/259
See application file for complete search history.

(56) References Cited

U.S. PATENT DOCUMENTS

| 2007/0030338 A1* | 2/2007 | Jiang et al. .................. 348/14.01 |
| 2007/0224873 A1* | 9/2007 | Thompson .................... 439/404 |
| 2008/0043642 A1* | 2/2008 | Park et al. .................... 370/259 |

FOREIGN PATENT DOCUMENTS

| CN | 1514562 A | 7/2004 |
| CN | 1604601 A | 4/2005 |
| CN | 1750569 A | 3/2006 |
| CN | 1787578 A | 6/2006 |
| CN | 1801856 A | 7/2006 |
| KR | 2004-086728 | * 10/2004 |
| KR | 1020050034050 A | 4/2005 |
| KR | 1020060003746 A | 1/2006 |
| WO | WO 2004/086782 A1 | 10/2004 |
| WO | WO 2005/004453 A1 | 1/2005 |
| WO | WO 2005/043926 A2 | 5/2005 |

(Continued)

OTHER PUBLICATIONS

Written Opinion of the International Searching Authority dated Jun. 21, 2007 in connection with International Patent Application No. PCT/CN2007/000737.

International Search Report dated Jun. 21, 2007 in connection with International Patent Application No. PCT/CN2007/000737.

(Continued)

*Primary Examiner* — Dwayne Bost
*Assistant Examiner* — Myron Wyche

(57) ABSTRACT

A Multimedia Customized Ring Back Tone (MRBT) service platform, a terminal and a system for implementing an MRBT service are provided in the present invention. A method for implementing an MRBT service is further disclosed, which includes: performing, by a Multimedia Ring Back Tone (MRBT) platform, a first media capability negotiation with a calling party before a called party answers a call after the calling party initiates the call to the called party; playing, by the MRBT platform, an MRBT for the calling party according to the result of the first media capability negotiation. The scheme of the present invention may implement an MRBT service in a 3G communication network.

26 Claims, 7 Drawing Sheets

FOREIGN PATENT DOCUMENTS

| WO | WO 2005043926 | * | 5/2005 |
| WO | WO 2005/057962 A1 | | 6/2005 |
| WO | WO 2006/009362 A1 | | 1/2006 |

OTHER PUBLICATIONS

Partial Translation of Office Action dated Aug. 28, 2009 in connection with Chinese Patent Application No. 200610058515.2.

Partial Translation of Office Action dated Apr. 29, 2010 in connection with Chinese Patent Application No. 200780000289.5.

Partial Translation of Office Action dated Jan. 6, 2011 in connection with Chinese Patent Application No. 200780000289.5.

Partial Translation of Office Action dated Mar. 21, 2008 in connection with Chinese Patent Application No. 200610111402.4.

* cited by examiner

… (US 8,131,265 B2)

SYSTEM AND METHOD FOR IMPLEMENTING MULTIMEDIA RING BACK TONE SERVICE

FIELD OF THE INVENTION

The present invention relates to Ring Back Tone (RBT) technologies in 3$^{rd}$ Generation (3G) communication network, and more particularly to an apparatus, a system and a method for implementing a Multimedia Ring Back Tone (MRBT) service.

BACKGROUND OF THE INVENTION

A RBT is a sound played by a network communication system to a calling party when the calling party calls a called party, and the RBT is generally a section of beeps in earlier. A Color Ring Back Tone (CRBT) service means that, when a calling party calls a called party and the called party is successfully paged and rings, the calling party may hear an RBT pre-customized by the called party, the calling party or the third party instead of default beeps. The RBT may be music, songs or voices. The CRBT service is applicable to not only a mobile communication network, but also a fixed communication network.

Along with the establishment of 3$^{rd}$ Generation mobile communication system Release 4 (3G R4), 3G R5 and Next Generation Network (NGN), a communication network is able to support a multimedia service, and a CRBT service is extended to a Multimedia Ring Back Tone (MRBT) service. The MRBT service means that, when a calling party calls a called party, after the called party is successfully paged and rings, the calling party may receive and play multimedia contents consisting of video and audio pre-customized by the called party, the calling party or the third party. Correspondingly, the original customized RBT service is termed as a voice CRBT service. Since the implementation of MRBT service is more complex than that of voice CRBT service, an existing voice CRBT service system can not be directly used for implementing the MRBT service.

SUMMARY OF THE INVENTION

Embodiments of the present invention provide a method, an apparatus and a system for implementing a Multimedia Ring Back Tone (MRBT) service.

A method for implementing a Multimedia Ring Back Tone (MRBT) service includes:
performing, by a Multimedia Ring Back Tone (MRBT) platform, a first media capability negotiation with a calling party upon receiving an MRBT service request from an Originated Mobile Switch Center (O_MSC) before a called party answers a call in a call connection process;
playing, by the MRBT platform, an MRBT for the calling party according to the result of the first media capability negotiation via a link established between the MRBT platform and the calling party after the first media capability negotiation is successful.

A Multimedia Ring Back Tone (MRBT) platform includes:
a first capability negotiation module configured to perform a first media capability negotiation with a calling party;
a link establishment module configured to establish a link between the MRBT platform and the calling party;
a CRBT service module configured to play an MRBT for the calling party according to the result of the first media capability negotiation.

A system for implementing a Multimedia Ring Back Tone (MRBT) service includes an Mobile Originated Mobile Switch Center (O_MSC), a Mobile Terminated Mobile Switch Center (T_MSC), and an MRBT platform; and
the O_MSC is configured to call a called party via the T_MSC, and send an MRBT service request of an MRBT service to the MRBT platform after receiving a request sent from a calling party; and
the MRBT platform is configured to perform a first media capability negotiation with the calling party upon receiving the MRBT service request from the O_MSC, and play an MRBT for the calling party according to the result of the first media capability negotiation.

A terminal for implementing a Multimedia Ring Back Tone (MRBT) service includes:
a media capability negotiation module configured to performing a media capability negotiation with a Multimedia Ring Back Tone (MRBT) platform or other terminals; and
a color Ring Back Tone (RBT) displaying module configured to display an MRBT played by an MRBT platform according to the result of the media capability negotiation.

A Mobile Switch Center (MSC) includes:
a component configured to:
instruct a Multimedia Ring Back Tone (MRBT) platform to perform a media capability negotiation with a terminal;
establish a link between the MRBT platform and the terminal by communicating with the MRBT platform, and instruct the MRBT platform to play an MRBT for the terminal via the link.

As the technical schemes mentioned above, before the called party answers during a call connection, the MRBT platform establishes a communication link from the MRBT platform to the calling party through an MGW after performing a media capability negotiation with the calling party, and sends a pre-subscribed MRBT to the calling party over the communication link. As a result, the system and method in accordance with the embodiments of the present invention may implement an MRBT service in a 3G communication network.

EMBODIMENTS OF THE INVENTION

The present invention is further explained hereinafter in detail with reference to the accompanying drawings as well as embodiments so as to make the technical solution and merits thereof more apparent.

During the development of a mobile communication network, it is a common condition that terminals and network devices with different capabilities coexist. In this way, when a Multimedia Ring Back Tone (MRBT) service is implemented, there is negotiation for communication between the terminals and network systems supporting 2G standard coexist with the terminals and network systems supporting 3G standard. For example, performing a capability negotiation between a network and a terminal is necessary. If a terminal and network devices support an MRBT service, an MRBT is played for the terminal; otherwise, a voice CRBT is played for the terminal.

Embodiments of the present invention are hereinafter described by taking a Wideband Code Division Multiple Access (WCDMA) system of 3G mobile communication system as an example. The detailed implementation for other communication systems may be achieved with respect to embodiments of the present invention.

Figure 1:
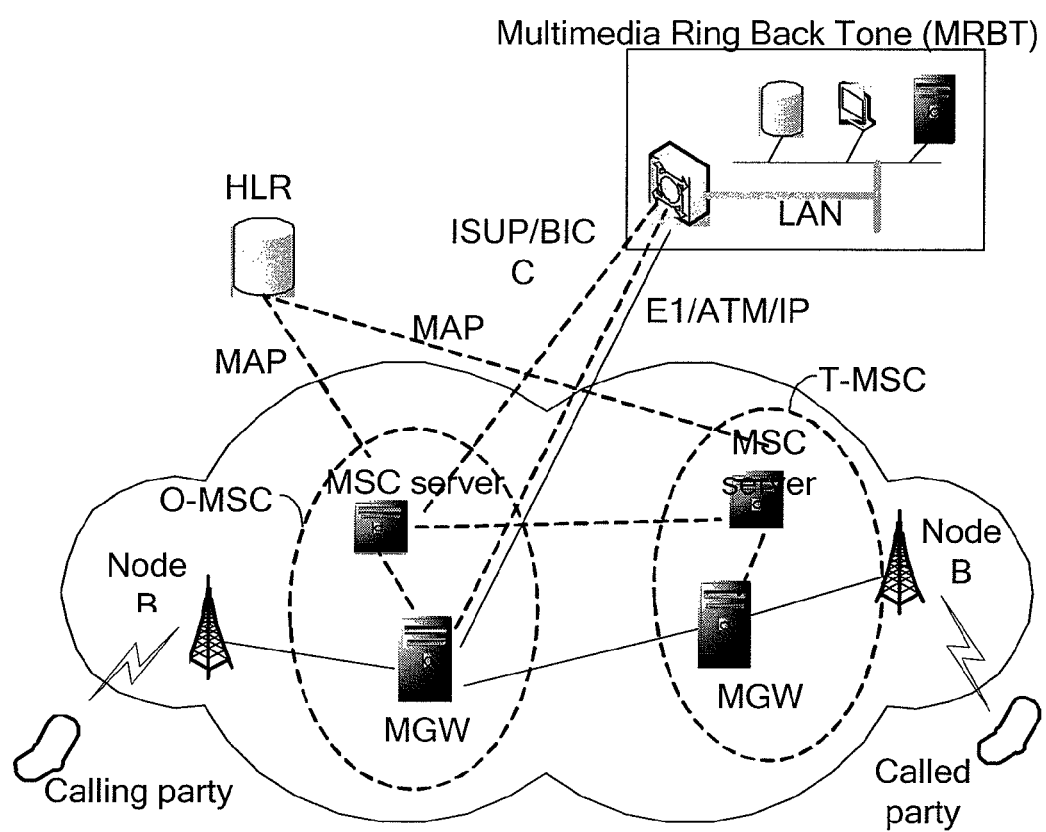
FIG. 1 is a schematic diagram illustrating a system for implementing an MRBT service in a WCDMA system in accordance with an embodiment of the present invention.

FIG. 1 is a schematic diagram illustrating a system for implementing an MRBT service in a WCDMA communication network system. The system for providing an MRBT service includes a calling party, a Node B to which the calling party belongs, an Originated Mobile Switching Center (O_MSC) administrating the Node B to which the calling party belongs, a called party, a Node B to which the called party belongs, a Terminated Mobile Switching Center (T_MSC) administrating the Node B to which the called party belongs, a Home Location Register (HLR) and a Multimedia Ring Back Tone (MRBT) platform.

The MSC, consisting of an MSC Server and a Media Gateway (MGW), is responsible for a service switching function and a call controlling function. An ISDN User Part (ISUP) protocol, a Session Initial Protocol (SIP) or a Bearer Independent Call Control (BICC) protocol is used for the interaction between the MSC Server and the MRBT. A Time Division Multiplexing (TDM) E1, an Asynchronous Transfer Mode (ATM) or an Internet Protocol (IP) is used for the bearer between the MGW and the MRBT. The O_MSC is a visited MSC of the calling party and the T_MSC is a visited MSC of the called party. The T_MSC is mainly used for storing the current information of the called party, and connecting the called party during a call connection. The ISUP protocol, the SIP or the BICC protocol is used for the interaction between the O_MSC and the T_MSC. The MGW is used for connecting the MRBT and the terminal, so that an MRBT sent by the MRBT platform may be sent to the calling party via the MGW.

The HLR is used for storing subscription information of the terminal, and communicating with the MSC to provide the MSC with user terminal information currently administrated by the MSC.

The MRBT platform is used for storing an MRBT pre-customized by the terminal, sending the MRBT to the calling party via the MGW after paging the called party successfully and receiving an Answer Message (ANM) from the T_MSC.

In the system as shown in FIG. 1, the MSC, the terminal or the MRBT platform may be used as an entity performing a media capability negotiation between the terminal and the MRBT platform. Alternatively, a dedicated network element may be added to the system for the media capability negotiation. The media capability negotiation means to determine the media format and decoding manner supported by two parties. The embodiment is hereinafter described by taking ISUP signaling as an example.

Embodiment 1

The MRBT Platform Initiates a Media Capability Negotiation to Implement an MRBT Service In the present embodiment, an O_MSC calls a called party according to a request of a calling party, and the called party returns a call response message according to the call. After receiving the call response message returned by the called party, the O_MSC notifies an MRBT platform of the type of the RBT to be played, and connects the calling party and the MRBT platform. The MRBT platform plays the MRBT for the calling party after initiating and performing a media capability negotiation with the calling party successfully.

In the present embodiment, it is possible to provide the calling party administrated by the O_MSC with an MRBT service by means of the cooperation between an MGW and the MRBT platform when the MSC Server has no capability to transmit multimedia information. It is necessary for recording whether a terminal activates an MRBT service in an HLR. The information associated with the terminal activating the MRBT service and the customized information is recorded in the MRBT platform. When the HLR returns to the MSC an response message of Send Routing Information (SRI), an "SS-CODE" will be carried in the response message to indicate whether the terminal activates the MRBT service.

Figure 2:
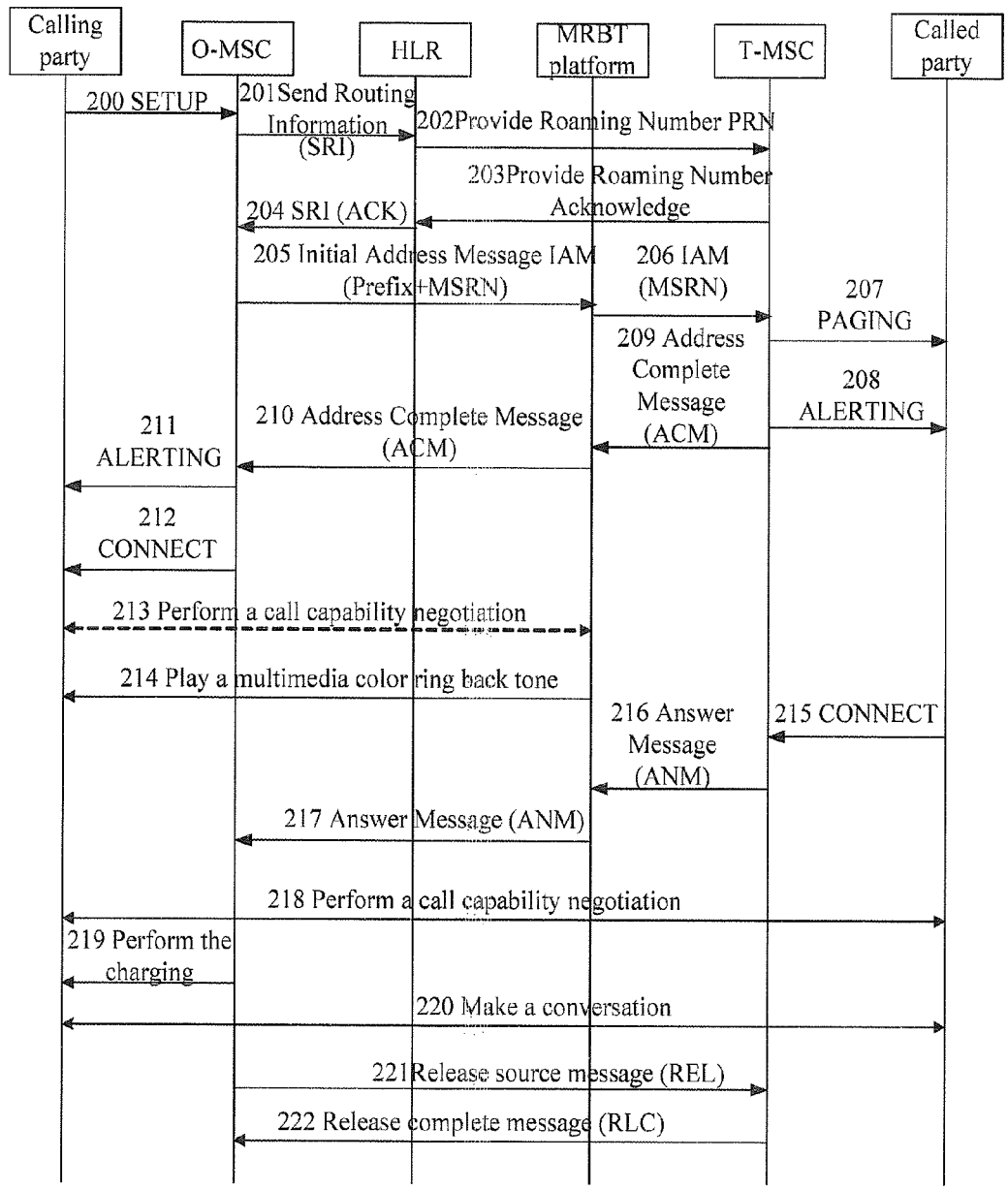
FIG. 2 is a signaling flow chart illustrating the process of implementing an MRBT service in accordance with Embodiment 1 of the present invention.
Figure 3:
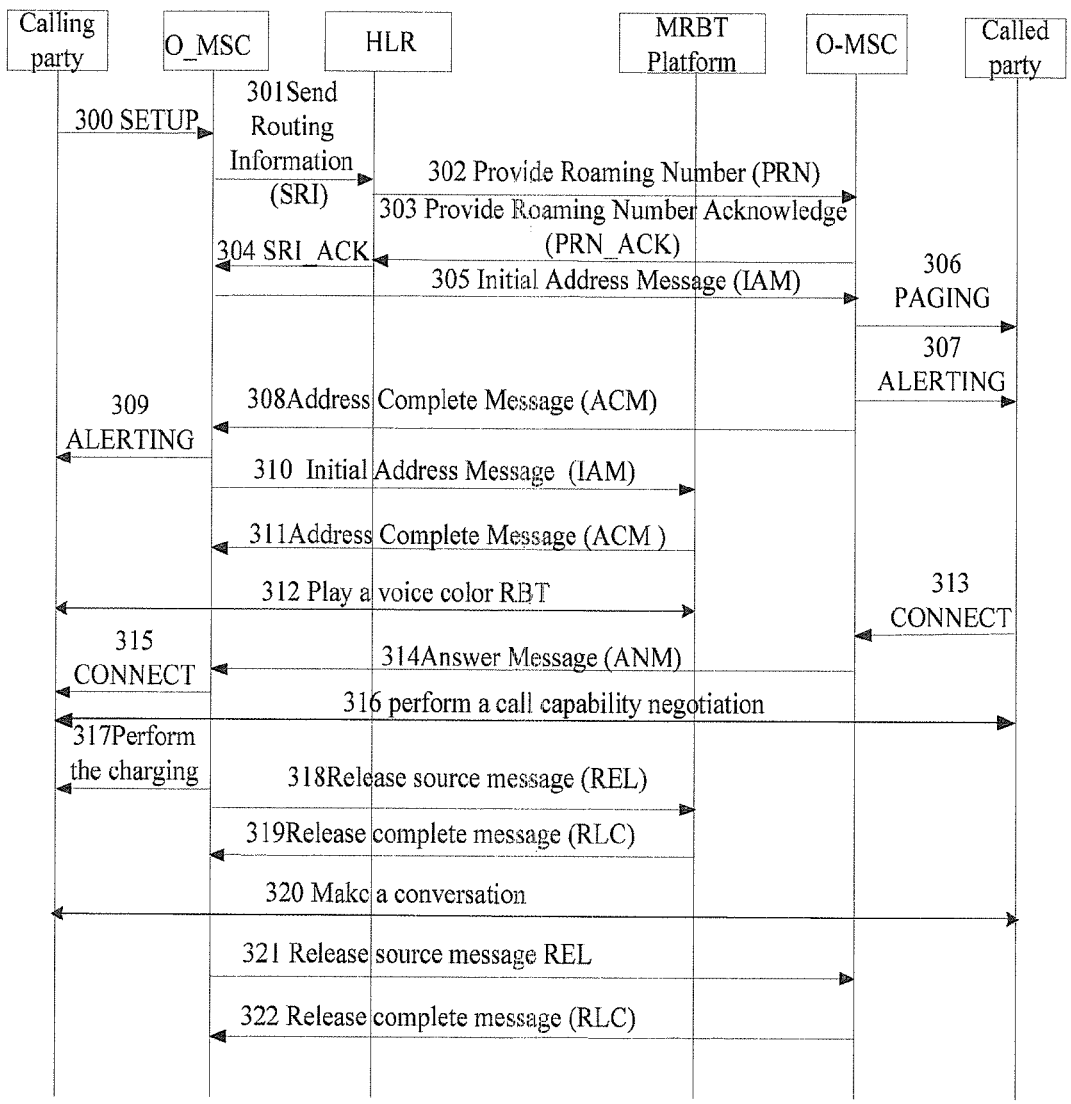
FIG. 3 is a signaling flow chart illustrating the process of implementing a voice CRBT service in accordance with Embodiment 1 of the present invention.

FIG. 2 and FIG. 3 illustrate flowcharts respectively for implementing an MRBT service and for implementing a voice customized RBT service in a WCDMA system in accordance with Embodiment 1 of the present invention. Referring to FIG. 2, suppose that the calling party is a 3G communication network terminal and the called party is a 3G communication network terminal. The calling party initiates a Video Phone (VP) call to the called party, and the ISUP protocol is used for the signaling interaction between the O_MSC and the T_MSC. The detailed processes are as follows.

200: The calling party dials the number of the called party, i.e. sends a SETUP message to the O_MSC to initiate a VP. The number of the called party is a Mobile Subscriber ISDN Number (MSISDN).

201: The O_MSC sends an SRI message for querying the HLR for the current location information of the called party according to the MSISDN carried by this call.

202: The HLR sends a Provide Roaming Number (PRN) message for obtaining the current roaming number of the called party to the T_MSC in which the called party is located.

203: The T_MSC sends the roaming number of the called party to the HLR by means of a Provide Roaming Number Acknowledge (PRN-ACK) message.

204: The O_MSC determines whether an MRBT service is allowed to be performed. The MRBT service may be customized by the called party. The HLR sends the obtained roaming number of the called party to the O_MSC by means of a Send Routing Information Acknowledge (SRI-ACK) message in which the SS-CODE may be set as a specific value designated by the operator for indicating that the called party has activated the MRBT service.

In practical applications, since an MRBT service may also be customized by the calling party or the third party, the O_MSC determines whether the HLR stores an MRBT service enjoyed by the calling party and presubscribed by the calling party, the called party or the third party.

205: The O_MSC determines that the calling party supports a CRBT service according to the SRI-ACK message, and determines that this call is a VP according to the network visited by the calling party, the call supported by the calling party and the property of initiating this call.

If the network visited by the calling party supports a VP, the calling party supports a VP, and the call initiated by the calling party is a VP, it is determined that this call is a VP; otherwise, it is determined that this call is a voice call. The whole procedure for handling a voice call is as shown in FIG. 3.

The O_MSC sends an Initial Address Message (IAM) carrying a called party number as "Prefix+Mobile Station Roaming Number (MSRN)" to the MRBT platform. The Prefix is used for the O_MSC to connect a call to the MRBT platform and for indicating the call is a VP. The MSRN is used for indicating the network visited by the called party.

206: After receiving the IAM message, the MRBT platform sends the call carrying the MSRN to the T_MSC.

207: The T_MSC pages the called party according to the MSRN carried by the call.

208: After the called party paging is successful, the called party sends an ALERTING message to the T_MSC.

209~210: After receiving the ALERTING message, the T_MSC sends an Address Complete Message (ACM) to instruct the O_MSC to connect the calling party.

211~212: After determining that it is possible to provide the calling party with an MRBT and sending an ALERTING message to the calling party, the O_MSC sends a CONNECT message for establishing a connection, and the charging is not performed at this point.

213: The calling party receiving the CONNECT message performs a first media capability negotiation with the MRBT platform. After the negotiation is successful, the MRBT platform establishes a communication link connecting with the calling party. The communication link may pass through the O_MSC or pass through the MGW of the O_MSC.

If there is no media type supported by both the calling party and the MRBT platform, the MRBT platform needs to convert the media type of MRBT into a type supported by the calling party before playing an MRBT in the subsequent 214.

214: The MRBT platform searches for the MRBT information according to the preset RBT service information, and plays the MRBT for the calling party via the MGW. The RBT service information may include the number of the called party, and the MRBT platform may find a corresponding MRBT according to the number of the called party. Since the called party may set different MRBTs for different numbers of terminals, the RBT service information may further include the number of the calling party. The MRBT platform needs to find, in the MRBTs customized by the called party, an MRBT corresponding to the number of the calling party according to the number of the called party.

215: After answering this call, the called party sends a CONNECT message to the T_MSC.

216: The T_MSC sends an Answer Message (ANM) to the MRBT platform.

217~218: The MRBT platform performs a second media capability negotiation, i.e. call capability negotiation, between the calling party and the called party, connects the calling party and the called party after the second media capability negotiation is successful, and sends an ANM to the O_MSC. The processes of performing the second media capability negotiation between the calling party and the called party by the MRBT platform include: initiating by the MRBT platform a media capability negotiation with the called party to determine the media type supported by both the MRBT platform and the called party, and obtaining the media type supported by both the calling party and the called party according to the media type supported by both the MRBT platform and the calling party determined in the above 213. If there is no media type supported by both the calling party and the called party, the MRBT platform needs to convert the media type, i.e. the MRBT platform converts the media stream sent to the called party into a type supported by the called party and converts the media stream sent by the called party into a type supported by the calling party.

The operation for connecting the calling party and the called party includes: establishing by the MRBT platform a communication link from the MRBT platform to the called party via the T_MSC, and establishing a communication link from the calling party to the called party via the MRBT platform by connecting the communication link from the MRBT platform to the called party with the communication link established in 213 via the MRBT platform.

219: The O_MSC receiving the ANM starts the charging for the calling party.

220: After the MRBT finishes the call capability negotiation between the calling party and the called party, the calling party communicates with the called party.

221~222: After the calling party or the called party terminates this conversation, the calling party sends an REL message to the T_MSC via the O_MSC, or the called party sends an REL message to the O_MSC via the T_MSC to release the connection between the calling party and the called party, so as to release the call. After the release is complete, the T_MSC returns a Release Complete (RLC) message, so that the O_MSC stops the charging for the calling party.

Since the MRBT platform has to establish a communication link from the MRBT platform to the calling party via the MGW before playing an MRBT for the calling party, the call capability negotiation between the MRBT platform and the calling party should be completed. After the communication link between the MRBT platform and the calling party is established, the O_MSC will receive the ACM sent by the MRBT platform but will not start the charging for the calling party at this point. After the communication link between the MRBT platform and the called party is established and the communication link between the calling party and the called party is formed by connecting the established communication link between the MRBT platform and the called party with the established communication link between the calling party and the MRBT platform via the MRBT platform, the O_MSC receives an ANM sent by the MRBT platform indicating that the calling party has been connected to the called party, and starts the charging for the calling party, so as to avoid the problem of performing the charging for the calling party when the communication link between the MRBT platform and the calling party needs to be pre-established for sending an MRBT. Thus, the calling party does not need to pay for the listening to an MRBT, thereby improving the user's enthusiasm for using an MRBT, which is favorable to the development of MRBT services.

To establish the communication link from the MRBT platform to the calling party via the MGW of the O_MSC, the MRBT platform performs a call capability negotiation with the calling party. Since the MRBT platform does not know the call capability level of the called party at this point, the MRBT platform will select a media format according to the call capability level supported by the calling party and play an MRBT for the calling party via the established communication link. After the called party is off hook to answer the call, the MRBT platform performs a call capability negotiation with the called party; if the called party does not support the media format selected by the MRBT platform for the calling party, this call will fail.

In accordance with the embodiments of the present invention, survey and statistics of the call capability level supported by various 3G communication terminals in the current communication network are performed to select a media format supported by all terminals before developing an MRBT service. The media format is set in the MRBT platform as the basis for the MRBT platform to perform a call capability negotiation with the calling party and the called party in the processes of playing an MRBT and communicating between the called party and the calling party.

In accordance with the embodiments of the present invention, several capability levels may be set in the MRBT platform for selecting the format in which the communication link from the MRBT platform to the calling party is established, thereby reducing the signaling interaction procedure for performing a call capability negotiation to establish a communication link and shortening the response time for playing an MRBT.

When the called party does not support the media format supported by the calling party selected in the process for playing an MRBT, the MRBT platform converts the media stream sent to the called party into the media type supported by the called party and converts the media stream sent by the called party into the media type supported by the calling party during a conversation, so as to guarantee the normal communication between the calling party and the called party.

In accordance with the embodiments of the present invention, the MRBT platform may also store a voice CRBT, customized by the called party and played for the calling party. FIG. 3 is a signaling flow chart illustrating the process of implementing a voice CRBT service in accordance with Embodiment 1 of the present invention. Suppose that the calling party is a 3G communication network terminal and the called party is a 2G communication network terminal. The calling party initiates a voice call to the called party or initiates a call in the 2G network. The ISUP protocol is used for the signaling interaction between the O_MSC and the T_MSC. The detailed processes are as follows.

300: The calling party dials a called party number, i.e. sends a SETUP message to the O_MSC to initiate a voice call; the called party number is an MSISDN for indicating the called party.

301: The O_MSC sends an SRI message for querying the current location information of the called party to the HLR.

302: The HLR sends a Provide Roam Number (PRN) message for obtaining the current roaming number of the called party to the T_MSC in which the called party is located.

303: The T_MSC sends the roaming called party number to the HLR by means of a Provide Roam Number Acknowledge (PRN-ACK) message.

304: The HLR sends the obtained roaming number of the called party to the O_MSC by means of a Send Routing Information Acknowledge (SRI-ACK) message in which the SS-CODE may be set as a specific value designated by the operator for indicating that the called party has activated an MRBT service.

305: The O_MSC determines that the called party supports a CRBT service according to the SRI-ACK message, and determines this call is a voice call according to the network visited by the calling party and the property of initiating this call.

If the communication network visited by the calling party supports a VP, the calling party supports a VP, and the call initiated by the calling party is a VP, it is determined that this call is a VP; otherwise, it is determined that this call is a voice call. The whole procedure for handling a VP is as shown in FIG. 2.

The O_MSC sends the call carrying the MSRN to the T_MSC, i.e. sends an IAM.

306: The T_MSC pages the called party according to the MSRN carried by the call.

307: After the called party paging is successful, the called party sends an ALERTING message to the T_MSC.

308: The T_MSC receiving the ALERTING message sends an ACM to the O_MSC.

309~310: The O_MSC receiving the ACM sends an ALERTING message to the calling party, and establishes a communication link from the calling party to the MRBT platform through the O_MSC by sending an IAM message to the MRBT platform.

311: The MRBT platform receiving the IAM message sends an ACM to the O_MSC.

312: The MRBT platform searches for the CRBT information customized by the called party for the calling party according to the preset RBT service information, and plays the voice CRBT for the calling party via the O_MSC.

313: After answering this call, the called party sends a CONNECT message to the T_MSC.

314: The T_MSC sends an ANM to the O_MSC.

315~317: The O_MSC receiving the ANM sends a CONNECT message to the calling party, establishes a communication link between the calling party and the called party after performing a call capability negotiation between the calling party and the called party, and starts the charging for the calling party.

318~319: The O_MSC sends an REL message to the MRBT platform to release the communication link with the MRBT platform. The MRBT platform receiving the REL message stops playing a voice CRBT for the calling party, releases the communication link between the MRBT platform and the O_MSC, and sends an RLC message to the O_MSC.

320: The calling party communicates with the called party over the established communication link.

321~322: After the calling party or the called party terminates this conversation, the calling party sends an REL message to the called party via the O_MSC and the T_MSC in turn, or the called party sends an REL message to the calling party via the T_MSC and the O_MSC in turn to release the connection between the calling party and the called party, so as to release the call. The O_MSC stops the charging for the calling party.

Not only the ISUP protocol, but also other protocols such as the BICC protocol or the SIP may be used between the O_MSC and the T_MSC in the present embodiment.

The MRBT platform of this embodiment in accordance with the present invention includes a CRBT service module, a link establishment module, a capability negotiation module and a media format conversion module.

The CRBT service module is used for storing an MRBT and setting the service information of the MRBT. The service information may be a called party number or a calling party number corresponding to an MRBT. The CRBT is played for the calling party according to the MRBT corresponding to the called party number or the calling party number from the O_MSC after the capability negotiation module finishes the capability negotiation with the calling party. The CRBT service module may further be applicable to the existing voice CRBT service and implement the functions associated with the voice CRBT service.

The link establishment module is used for the interaction with the O_MSC and establishing a link between the MRBT platform and the calling party via the O_MSC.

The capability negotiation module includes a first capability negotiation module and a second capability negotiation module. The first capability negotiation module is used for performing a media capability negotiation with the calling party and notifying the CRBT service module of the negotiation result. The second capability negotiation module is used for performing a media capability negotiation with the called party after the called party answers the call, and instructing the link establishment module to establish a link from the MRBT platform to the called party via the T_MSC. The link from the MRBT platform to the called party and the established link from the MRBT platform to the calling party form the voice channel between the calling party and the called party.

The media format conversion module is used for converting an MRBT into a format supported by the calling party according to the media capability of the calling party obtained by the first capability negotiation module, and converting a media stream sent to the called party into a media type supported by the called party and converting a media stream sent by the called party into a media type supported by the calling party according to the negotiation results provides by the first capability negotiation module and the second capability negotiation module.

Embodiment 2

The Calling Party Initiates a Media Capability Negotiation to Implement an MRBT Service In the present embodiment, the O_MSC calls the called party according to a request of calling party, and the called party returns a call response message according to the call. After receiving the call response message returned by the called party, the O_MSC notifies the MRBT platform of the type of the RBT to be played, and connects the calling party and the MRBT platform. The MRBT platform plays the MRBT for the calling party after performing the first media capability negotiation with the calling party successfully. In the present embodiment, the calling party may perform a second media capability negotiation with the called party after the called party answers the call of calling party. After the second media capability negotiation is completed, the calling party communicates with the called party.

Figure 4:
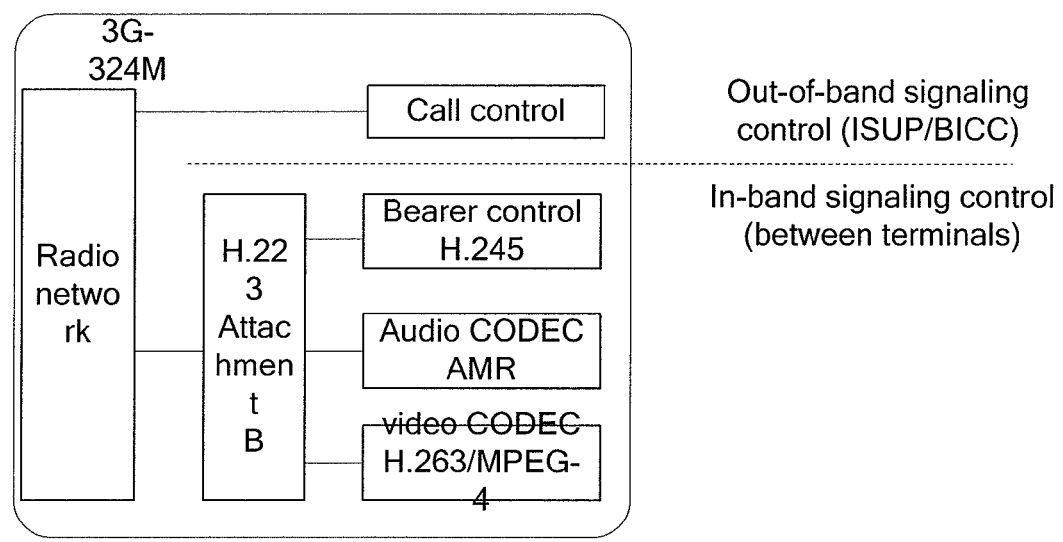
FIG. 4 is a schematic diagram illustrating the structure of H.324M protocol stack.

To support a video phone call of 3G circuit switched domain, a 3G visual terminal may support the H.324M protocol. FIG. 4 is a schematic diagram illustrating the structure of an H.324M protocol stack. Referring to FIG. 4, the H.324M protocol defines that, during the establishment of the video phone call, after the network completes the out-of-band signaling control based on the ISDN User Part (ISUP) protocol or the Bearer Independent Call Control (BICC) protocol, the in-band signaling controls based on H.245 protocol is performed between terminals and a terminal or between a terminal and a service platform, such as terminal capability negotiation, master/slave determination, logical channel on/off and sending multiplexing table.

A media capability negotiation function is added in the MRBT platform in the present embodiment, so that the MRBT platform serves as an H.245 virtual terminal to complete the media capability negotiation with the calling party during the media capability negotiation. The support for a video and audio CODEC format may be added in the MRBT platform in the present embodiment so as to play an MRBT for a user.

Figure 5:
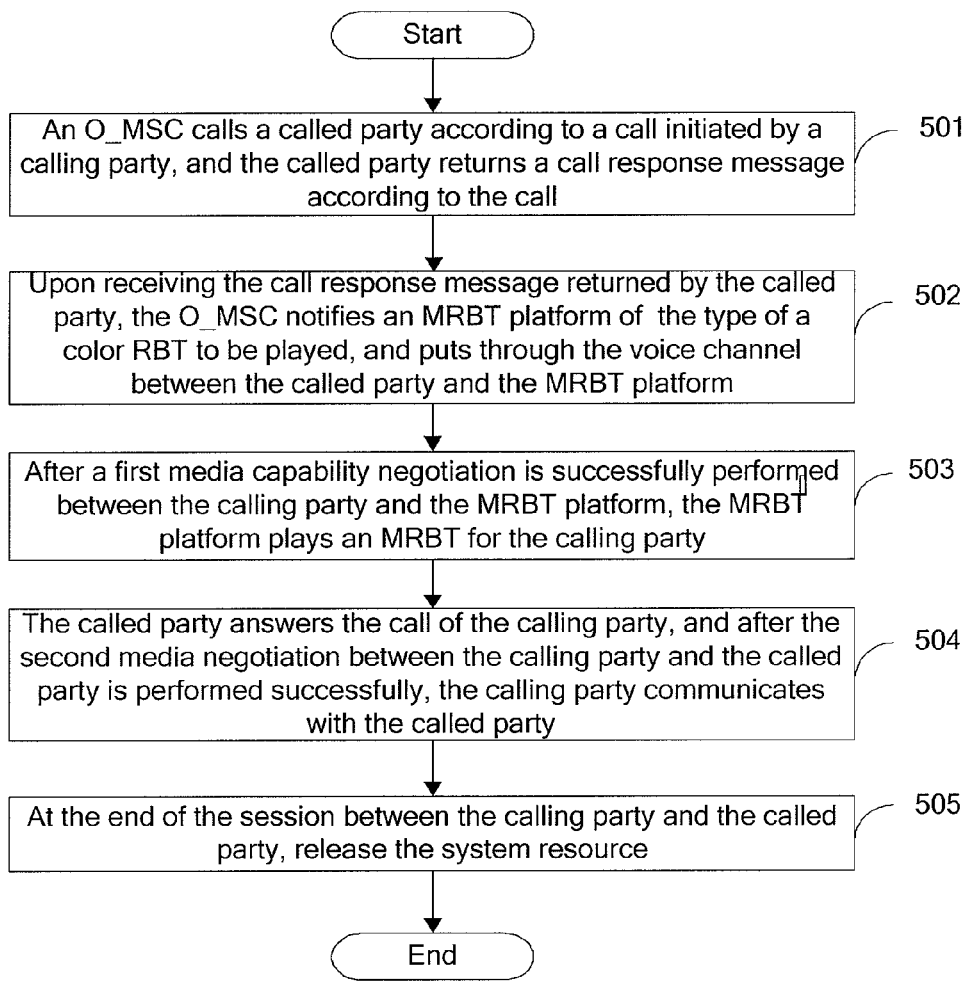
FIG. 5 is a schematic diagram illustrating a complete conversation procedure for a video phone call in accordance with Embodiment 2 of the present invention.

FIG. 5 is a schematic diagram illustrating the complete conversation procedure used for a video phone call in accordance with Embodiment 2 of the present invention. Referring to FIG. 5, the method is as follows.

Block 501: Upon receiving a call request from a calling party, an O_MSC calls a called party according to the called party number carried by the call request; and the called party returns a call response message according to the call.

Block 502: Upon receiving the call response message returned by the called party, the O_MSC notifies the MRBT platform of the type of the CRBT to be played, and puts through a voice channel between the calling party and the MRBT platform.

Block 503: A first media capability negotiation is performed between the calling party and the MRBT platform. If the first media capability negotiation is successful, the MRBT platform plays an MRBT for the calling party.

Block 504: The called party answers the call of the calling party, and the calling party communicates with the called party after the second media capability negotiation between the calling party and the called party is performed successfully.

Block 505: At the end of the session between the calling party and the called party, release the system resource.

Up to now, this video conversation is end.

The system networking structure of Embodiment 2 is as shown in FIG. 1. The MRBT platform provides a multimedia playing function and a media capability negotiation function for performing a first media capability negotiation with the calling party and playing an MRBT for the calling party.

The calling party is used for initiating a call to the called party, initiating a first media capability negotiation to the MRBT platform, and performing the second media capability negotiation with the called party.

The O_MSC is used for calling the called party according to the call initiated by the calling party, receiving a call response message returned by the called party, notifying the MRBT platform of the type of the CRBT to be played, and putting through a voice channel between the calling party and the MRBT platform.

The called party is used for returning a call response message according to the call of the O_MSC, and performing the second media capability negotiation with the calling party.

It is presumed that the calling party and the called party are 3G users subscribing to a basic Video Phone (VP) service, and the called party is a user subscribing to an MRBT service. In order to simplify the description, it is further presumed that the calling party and the called party homing to one HLR, and the ISUP protocol is used for the signaling interaction between the O_MSC and the T_MSC as well as between the MSC and the MRBT platform.

Figure 6:
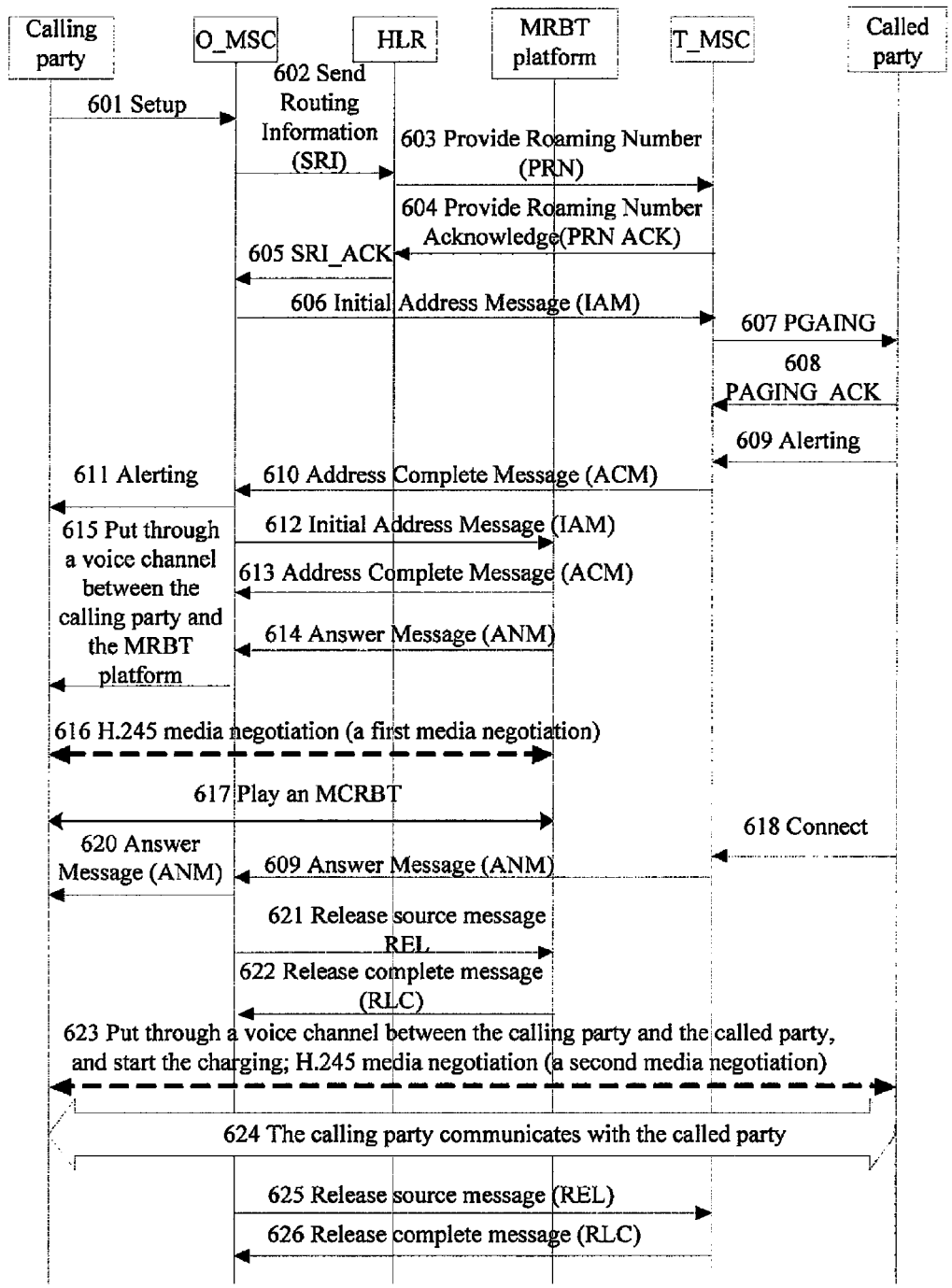
FIG. 6 is a flow chart of signaling illustrating the process of implementing an MRBT service in accordance with Embodiment 2 of the present invention.

FIG. 6 is a flowchart of signaling illustrating the process of implementing an MRBT service in accordance with Embodiment 2 of the present invention. The signaling flow is as follows.

601: The calling party dials the number of called party to send a SETUP message to the O_MSC.

602: The O_MSC sends an SRI message to the HLR.

603: the HLR sends a Provide Roaming Number (PRN) message to the T_MSC in which the called party is located according to the SRI message received from the O_MSC.

604: The T_MSC receives the PRN message from the HLR, and returns the roaming number of called party to the HLR by means of a PRN Acknowledge (PRN_ACK) message.

605: The HLR sends the roaming number of called party obtained from the T_MSC to the O_MSC by means of an SRI Acknowledge (SRI_ACK) message, and set the SS_CODE field of the SRI_ACK message as 254(0XFE) to indicate that the called party has subscribed to an MRBT service. Likewise, an MRBT service may also be customized by the calling party or the third party as the same as Embodiment 1.

606: The O_MSC analyzes and records the property of called party according to the received SS_CODE, and initiates a call for the called party to the T_MSC by means of an Initial Address Message (IAM).

607~609: The T_MSC pages the called party; the called party returns a PAGING_ACK to the T_MSC, and sends an Alerting message to the T_MSC.

610: Upon receiving the Alerting message sent by the called party, the T_MSC sends an Address Complete Message (ACM) to the O_MSC.

611: The O_MSC sends an Alerting message to the calling party.

612: The O_MSC sends an Initial Address Message (IAM) to the MRBT platform by taking the MSISDN of called party as the number of called party, and instructs the MRBT platform to play an MRBT or a voice CRBT using the IAM.

In this process, the method for the O_MSC to determine the type of the CRBT to be played is as follows.

The O_MSC analyzes the property of called party recorded in 606; the SS_CODE field is set as 254 (0XFE) in the present embodiment to indicate that the called party has activated an MRBT service.

The corresponding process is performed in accordance with the network in which an MSC initiating the call, i.e. O_MSC, is located, and the property of initiating the call as follows.

If this call is a video phone call initiated by the calling party in a 3G network, it is determined to instruct the MRBT platform to play an MRBT. If this call is a common call initiated by the calling party in the 3G network or other networks apart from the 3G network, it is determined to instruct the MRBT platform to play a voice CRBT.

If an MRBT is played, proceed to 613, and perform the subsequent processes of the embodiment of the present invention. If a voice CRBT is played, the subsequent processes are the same as that of the existing voice CRBT technology.

613~614: The MRBT platform returns an Address Complete Message (ACM) and an Answer Message (ANM) to the O_MSC to prepare to play an MRBT.

In this process, the MRBT platform queries for information customized for the calling party by the called party according to the number of calling party and the number of called party, and determines an MRBT to be played according to information received from the O_MSC.

615: The O_MSC puts through the voice channel between the calling party and the MRBT platform, and the charging is not performed at this point.

616: The calling party initiates a media capability negotiation to the MRBT platform, and MRBT platform performs a media capability negotiation with the calling party by means of the H.245 protocol and puts through the network.

The media capability negotiation of this process is the first media capability negotiation of calling party.

617: The MRBT platform plays an MRBT for the calling party.

618: The called party answers the call of calling party and sends a CONNECT message to the O-MSC.

619~620: The T_MSC sends an Answer Message (ANM) to the O_MSC, and the O_MSC forwards the ANM to the calling party.

621: After receiving the ANM from the T_MSC, the O_MSC releases the bearer connection with the MRBT platform, and sends a Release (REL) message to the MRBT platform.

622: After the resource is released, the MRBT platform returns a Release Complete (RLC) message to the O_MSC.

623: The O_MSC puts through the voice channel between the calling party and the called party, and performs the charging for the calling party; the called party initiates a media capability negotiation and the calling party completes the media capability negotiation with the called party by means of the H.245 protocol.

In this process, the media capability negotiation may also be initiated by the calling party. The media capability negotiation of this process is the second media capability negotiation of the calling party.

624: After finishing the media capability negotiation with the called party, the calling party communicates with the called party.

625: When the calling party is on hook, the O_MSC sends an REL message to the T_MSC to release the connection between the calling party and the called party.

626: After the connection is released, the T_MSC returns a Release Complete (RLC) message to the O_MSC.

Up to now, the signaling interaction for implementing an MRBT service scheme of the embodiment of the present invention is completed.

Figure 7:
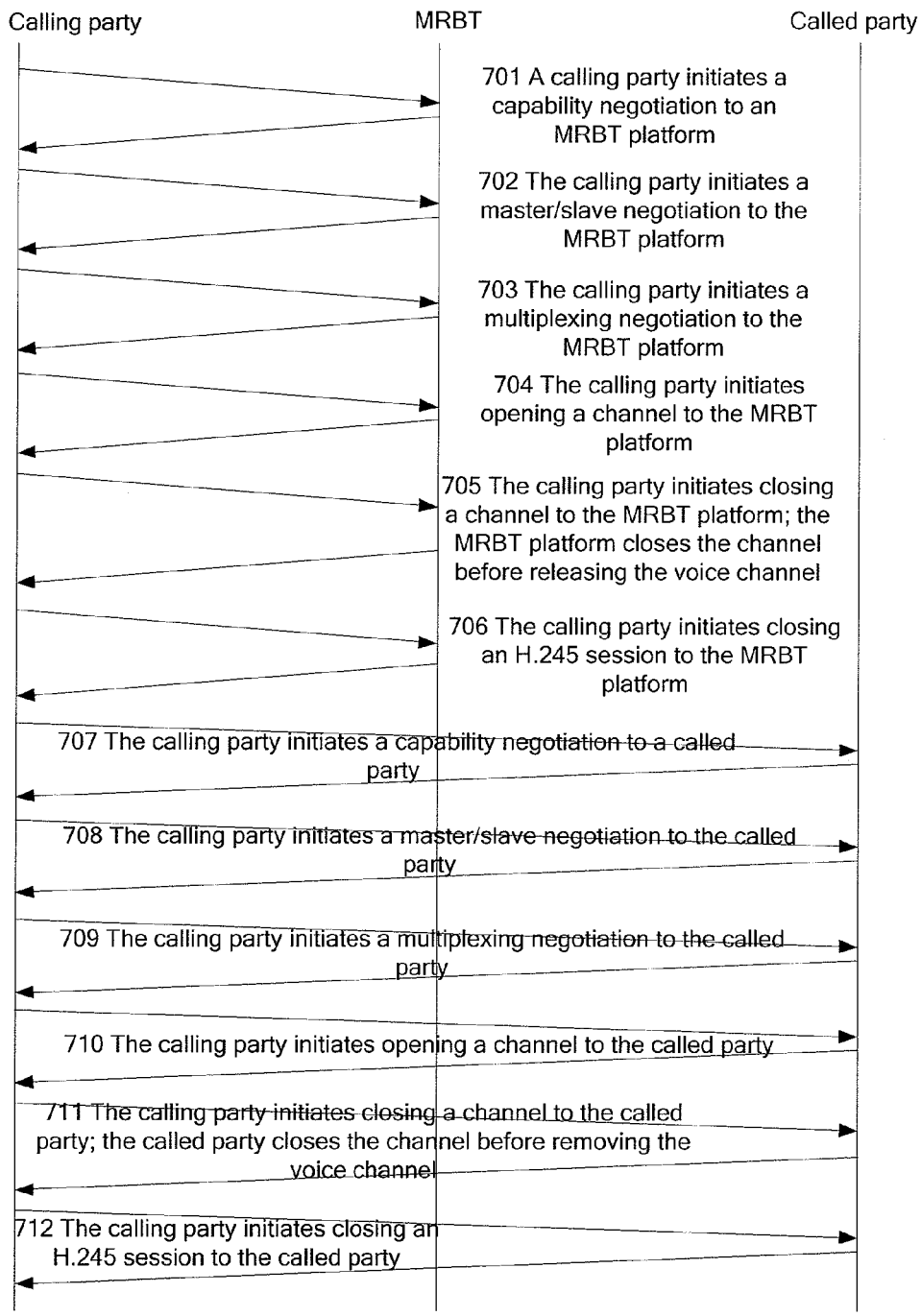
FIG. 7 is a schematic diagram illustrating a second media negotiation procedure of a calling party in accordance with Embodiment 2 of the present invention.

FIG. 7 is a schematic diagram illustrating the procedure of the second media capability negotiation of the calling party in accordance with Embodiment 2 of the present invention. The procedure is as follows.

701: The calling party initiates a capability negotiation to the MRBT platform.

702: The calling party initiates a master/slave negotiation to the MRBT platform.

703: The calling party initiates a multiplexing negotiation to the MRBT platform.

704: The calling party initiates opening a channel to the MRBT platform.

705: The calling party initiates closing a channel to the MRBT platform; the MRBT platform closes the channel before releasing the voice channel.

706: The calling party initiates closing the H.245 session to the MRBT platform.

707: The calling party initiates a capability negotiation to the called party.

708: The calling party initiates a master/slave negotiation to the called party.

709: The calling party initiates a multiplexing negotiation to the called party.

710: The calling party initiates opening a channel to the called party.

711: The calling party initiates closing a channel to the called party; the called party closes the channel before releasing the voice channel.

712: The calling party initiates closing an H.245 session to the called party.

In the procedure of media capability negotiation as shown in FIG. 7, the negotiation of 707~712 may also be initiated from the called party to the calling party.

In Embodiment 2, the O_MSC calls the called party according to the call initiated by the calling party, and the called party returns a call response message according to the call. After receiving the call response message returned by the called party, the O-MSC notifies the MRBT platform of the type of the CRBT to be played, and puts through the voice channel between the calling party and the MRBT platform. The MRBT platform plays the MRBT for the calling party after performing the first media capability negotiation with the calling party successfully.

In addition, the calling party may perform a second media capability negotiation with the called party after the called party answers the call initiated by the calling party, so that the calling party may communicate with the called party based on the second media capability negotiation. After the second media capability negotiation is complete, the calling party communicates with the called party. As a result, a network device may provide an MRBT service using the same voice channel control manner as that of the voice CRBT.

The terminal needs to have a function of the second media capability negotiation in Embodiment 2, and includes the following modules:

a conversation module for initiating a call or listening to a call, and implementing the conversation with the other side terminal. The conversation module may be a conversation module of the existing terminal;

a CRBT playing module for playing the received MRBT or voice CRBT;

a media capability negotiation module for performing a media capability negotiation with the MRBT platform after the terminal as the calling party establishes a communication link with the MRBT platform, and performing a media capability negotiation with the called party (calling party) as the calling party (called party).

The scheme for the MSC or an independent network element to perform the capability negotiation between the calling party and the MRBT platform may be as shown in the above embodiments.

Since the CRBT service of the embodiments of the present invention is a service enjoyed by the calling party, the processing rule for playing a voice CRBT and an MRBT depends on the property of calling party and whether the network visited by the calling party supports an MRBT, but is independent of the property of called party and whether the network visited by the called party supports an MRBT. The rule for different calling parties implementing different types of CRBT in different communication networks is as follows.

When the calling party is a 2G terminal and the network visited by the calling party is a 2G communication network, a voice CRBT may be played for the calling party in accordance with the embodiment of the present invention. When the calling party is a 2G terminal and the network visited by the calling party is a 3G communication network, a voice CRBT may be played for the calling party in accordance with the embodiment of the present invention. When the calling party is a 3G terminal and the network visited by the calling party is a 2G communication network, a voice CRBT may be played for the calling party in accordance with the embodiment of the present invention. When the calling party is a 3G terminal and the network visited by the calling party is a 3G communication network, an MRBT may be played for the calling party whether the network visited by the called party is a 3G network or a 2G network in accordance with the embodiment of the present invention.

In a 3G network, when the calling party communicates with the called party, if the calling party is a 3G communication network terminal and the network visited by the calling party is a 3G communication network while the called party is a 2G terminal, or the called party is a 3G terminal but does not support the VP, or the called party is a 3G terminal but the network visited by the called party is a 2G network, the calling party makes a voice conversation with the called party instead of a video conversation.

In accordance with the embodiments of the present invention, an MRBT service is implemented not only in a WCDMA system but also in the 3G communication network supporting multimedia information transmission.

In addition, when the called party is a 2G terminal, or the called party is a 3G terminal but does not support the VP, or the called party is a 3G terminal but the network visited by the called party is a 2G network, the embodiments of the present invention may also provide an MRBT service to terminals and guarantee that the called party is able to communicates with the called party normally, i.e. when the called party is a 2G terminal, or the called party is a 3G terminal but does not support the VP, or the called party is a 3G terminal but the network visited by the called party is a 2G network, an MRBT may also be applied. When a 3G terminal supporting the VP as the calling party dials a 2G terminal applying an MRBT service or a 3G terminal not supporting the VP, an MRBT is played for the calling party.

It should be emphasized that the above-described embodiments, particularly, any preferred embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

What is claimed is:

1. A method for implementing a Multimedia Ring Back Tone (MRBT) service, comprising:
   determining, by an Originated Mobile Switching Center (O-MSC), whether to perform an MRBT;
   if yes, sending, by the O-MSC, a first message to an MRBT platform to set up a call with the MRBT platform;
   after a called party paging is successful,
   sending, by the O-MSC, a second message to a calling party to establish a connection between the calling party and the MRBT platform;
   performing, by the MRBT platform and the calling party, a first media capability negotiation after the connection is established;
   playing, by the MRBT platform, an MRBT for the calling party according to the result of the first media capability negotiation via the connection established between the MRBT platform and the calling party before the call is answered.

2. The method of claim 1, wherein the determining whether to perform the MRBT further comprises:
   obtaining, by the O_MSC, subscription information of a Color Ring Back Tone (CRBT) service from a Home Location Register (HLR); and
   determining the MRBT service has been subscribed.

3. The method of claim 1, wherein the determining whether to perform the MRBT further comprises:
   determining a network visited by the calling party supports a video phone call,
   determining the calling party supports a video phone call, and
   determining the call initiated by the calling party is a video phone call.

4. The method of claim 1, wherein the playing the MRBT comprises:
   converting a media type of the MRBT into a media type supported by the calling party; and
   playing the MRBT with the media type supported by the calling party for the calling party.

5. The method of claim 1, further comprising:
   performing a second media capability negotiation related to the called party after the called party answers the call;
   establishing a connection between the calling party and the called party, communicating between the calling party and the called party via the connection between the calling party and the called party.

6. The method of claim 5, wherein the performing the second media capability negotiation further comprises:
performing, by the MRBT platform, a media capability negotiation with the called party, and obtaining a media type both supported by the calling party and the called party according to the media type obtained in the first media capability negotiation; and
the establishing the connection between the calling party and the called party comprises:
establishing, by the MRBT platform, a connection between the called party and the MRBT platform.

7. The method of claim 6, wherein the communicating between the calling party and the called party comprises:
converting, by the MRBT platform, a media type of a media stream sent to the called party into a media type supported by the called party, and
converting a media type of a media stream sent by the called party into a media type supported by the calling party.

8. The method of claim 5, wherein the performing the second media capability negotiation comprises:
initiating, by the calling party, a media capability negotiation with the called party, the media capability negotiation being used to determine a media type both supported by the calling party and the called party; and
the establishing the connection between the calling party and the called party comprises:
releasing, by the O-MSC, the connection between the calling party and the MRBT platform; and
establishing a connection between the calling party and the called party via the O_MSC and a Terminated Mobile Switching Center (T-MSC).

9. The method of claim 5, wherein:
the performing the second media capability negotiation comprises:
initiating, by the called party, a media capability negotiation with the calling party, the media capability negotiation being used to determine a media type both supported by the calling party and the called party; and
releasing, by the O-MSC, the connection between the calling party and the MRBT platform; and
establishing, a connection between the calling party and the called party via the O_MSC and a Terminated Mobile Switching Center (T-MSC).

10. The method of claim 5, further comprising:
charging for the calling party after establishing the connection between the calling party and the called party.

11. The method of claim 1, wherein the first media capability negotiation is initiated by the calling party.

12. The method of claim 1, wherein the first media capability negotiation is initiated by the MRBT platform.

13. The method of claim 1, wherein the connection is established by the O_MSC.

14. The method of claim 1, wherein the connection is established by the MRBT platform.

15. A Multimedia Ring Back Tone (MRBT) platform, comprising:
a first capability negotiation module configured to perform a first media capability negotiation with a calling party; wherein the first media capability negotiation comprises: determining a media type supported by both the calling party and the MRBT platform,
a link establishment module configured to establish a connection between the MRBT platform and the calling party, wherein the process of connection establishment further comprises,
if it is determined to perform an MRBT;
sending, by an Originated Mobile Switching Center (O-MSC), a first message to the MRBT platform to set up a call with the MRBT platform;
after a called party paging is successful,
sending, by the O-MSC, a second message to the calling party to establish a connection between the calling party and the MRBT platform;
a CRBT service module configured to play an MRBT for the calling party via the connection according to the result of the first media capability negotiation.

16. The MRBT platform of claim 15, further comprising:
a media format conversion module configured to convert a format of the MRBT into a format supported by the calling party according to the result of the first media capability negotiation.

17. The MRBT platform of claim 15, further comprising:
a second capability negotiation module configured to perform a second media capability negotiation related to a called party; wherein
the link establishment module is further configured to establish a link between the MRBT platform and the called party after the second media capability negotiation is successful.

18. The MRBT platform of claim 17, further comprising:
a media format conversion module configured to convert a media type of a media stream sent to the called party into a media type supported by the called party, and convert a media type of a media stream sent by the called party into a media type supported by the calling party.

19. A system for implementing a Multimedia Ring Back Tone (MRBT) service, comprising an Mobile Originated Mobile Switch Center (O_MSC), a Mobile Terminated Mobile Switch Center (T_MSC), and an MRBT platform; wherein
the O_MSC is configured to determine whether to perform an MRBT;
if yes, sending, by the O-MSC, a first message to the MRBT platform;
after the called party paging is successful,
sending, by the O-MSC, a second message to the calling party to establish a connection between the calling party and the MRBT platform;
the MRBT platform is configured to perform a first media capability negotiation with the calling party via the connection between the MRBT and the calling party, and play an MRBT for the calling party according to the result of the first media capability negotiation.

20. The system of claim 19, further comprising:
a Home Location Register (HLR), configured to store subscription information of the MRBT service; wherein:
the O_MSC is further configured to obtain the subscription information of the MRBT service from the HLR, determine whether to provide the calling party with the MRBT service according to the subscription information of MRBT service.

21. The system of claim 19 wherein the MRBT platform is further configured to perform a second media capability negotiation with the called party.

22. A Mobile Switch Center (MSC), comprising:
a component configured to:
determine whether to perform an MRBT;
if yes, send a first message to an MRBT platform to set up a call with the MRBT platform;
after a called party paging is successful,
send a second message to the calling party to establish a connection between the calling party and the MRBT platform;
instruct a Multimedia Ring Back Tone (MRBT) platform to perform a media capability negotiation with a calling terminal and play an MRBT for the calling terminal via the established connection.

23. The MSC of claim 22, wherein:
the component is further configure to release the link between the MRBT platform and the terminal, and establish a link between the calling terminal and a called terminal.

24. The method of claim 1, further comprising:
No charging for the calling party after the establishing the connection between the calling party and MRBT platform.

25. The method of claim 1, wherein
sending, by the O-MSC, a first message to the MRBT platform to set up a call with the MRBT platform further comprises:
sending, by the O-MSC, an IAM message to the MRBT platform, wherein the IAM message comprises the identification that the call is a Video Phone (VP), call.

26. The method of claim 1, wherein
after the called party paging is successful, receiving, by the O-MSC, a ACM message from the MRBT platform, instructing the O-MSC to connect the calling party, and
sending, by the O-MSC, a second message to the calling party to establish a connection between the calling party and the MRBT platform.

* * * * *

UNITED STATES PATENT AND TRADEMARK OFFICE
CERTIFICATE OF CORRECTION

PATENT NO. : 8,131,265 B2
APPLICATION NO. : 11/964075
DATED : March 6, 2012
INVENTOR(S) : Yihua Cheng, Xiaoqing Hu and Yichu Zheng Page 1 of 1

It is certified that error appears in the above-identified patent and that said Letters Patent is hereby corrected as shown below:

In the Claims

Column 16, Claim 19, line 45, after "platform" insert -- to set up a call with the MRBT platform --.

Signed and Sealed this
Seventh Day of May, 2013

Teresa Stanek Rea
*Acting Director of the United States Patent and Trademark Office*